Feb. 4, 1958　　　　　D. DE NOBEL　　　　　2,822,299
METHOD OF MAKING A CADIUM-TELLURIDE SEMI-CONDUCTIVE DEVICE
Filed Nov. 28, 1955

INVENTOR
DIRK DE NOBEL
BY
AGENT

United States Patent Office 2,822,299
Patented Feb. 4, 1958

2,822,299

METHOD OF MAKING A CADMIUM-TELLURIDE SEMI-CONDUCTIVE DEVICE

Dirk de Nobel, Eindhoven, Netherlands, assignor, by mesne assignments, to North American Philips Company, Inc., New York, N. Y., a corporation of Delaware Application November 28, 1955, Serial No. 549,528

4 Claims. (Cl. 117—200)

The invention relates to the manufacture of a semi-conductive device, and, in particular, to the provision of a tellurium layer on a semi-conductive body of cadmium-telluride.

Tellurium layers on cadmium-telluride, if this is of p-type conductivity, provide an ohmic contact, whereas on n-type conductive material they have a rectifying or a photo-sensitive effect.

The invention is based on the recognition of the fact that in a simple manner a tellurium layer can be obtained on cadmium-telluride, by converting the cadmium-telluride superficially into tellurium.

According to the invention, the semi-conductive body is treated to this end with an oxidizing solution. If the solution for the treatment has too weak an oxidizing effect, no reaction takes place. In case of too strong an oxidizing effect, the cadmium-telluride is converted partly into tellurium oxide, cadmium being dissolved.

Under intermediate circumstances, the Cd of the Cd–Te is preferentially oxidized to CdO, which then dissolves in the solution so that a tellurium layer is produced on the cadmium-telluride body.

The oxidizing conditions may be intensified not only by the choice of the oxidizing substance, but also by the concentration of this substance in a solution, by the temperature of the solution, and by the time during which the semi-conductive body is treated. Under strongly acidic conditions the reaction takes places at a lower temperature and the formation of tellurium oxide is less troublesome. The conditions suitable for the oxidization may be fixed simply with the aid of a few experiments, as is indicated in the table, which shows the results of subjecting the Cd–Te body to different oxidizing treatments. The best treatments are obviously those that produce a tellurium layer only on the Cd–Te body.

Figure 1:
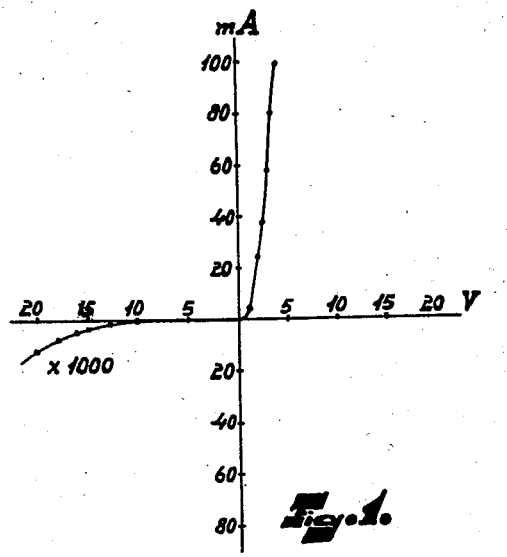
Figure 2:
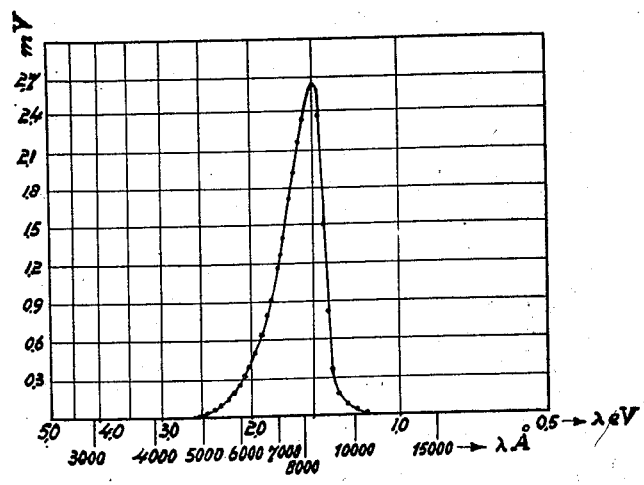

For acidifying the solutions, use is preferably made of HCl, since acids such as $H_2SO_4$, $HNO_3$ and $HClO_4$ have an oxidizing effect in themselves, and acids like HF, HBr and HI can be handled less readily. Two preferred examples follow, the second one to be described in connection with the accompanying drawing, of which Figs. 1 and 2 show operating characteristics of a Cd–Te semiconductor made by the invention:

Example 1

A plate of p-type conductive CdTe, specific resistivity about $1.5 \times 10^2$ ohm-cm. is treated for example with a solution of 0.3% of $FeCl_3$ at a temperature of 70° C. for five minutes. The tellurium layer produced superficially constitutes with the CdTe an ohmic contact.

Example 2

An n-type conductive CdTe crystal plate with about $3 \times 10^{17}$ charge carriers per cm.$^3$ is provided with a tellurium layer by treating it at 40° with a solution of 20.2% of HCl and 3% of $HNO_3$ for about one minute. The tellurium layer is removed on one side, for example by scouring. On this side provision is made of an ohmic contact by fusing thereto indium at 500° C. in a mixture of nitrogen and 10% hydrogen. The rectifier obtained by means of the remaining tellurium layer has a current-voltage characteristic curve as shown in Fig. 1.

Upon an exposure with about 2700 lux from a tungsten-type lamp (colour temperature 2800° K.) the rectifier possesses a photo-E. M. F. and/or a photo-current. The short-circuiting current is 150 μa. and the voltage at an infinite external resistance is 500 mv.

It is evident from Fig. 2, in which the variation of the photo-E. M. F. is plotted against the wavelength, that the maximum sensitivity lies at a wavelength of 8250 A.

What is claimed is:

1. A method of providing a tellurium layer on a cadmium-telluride semi-conductive body, which comprises subjecting a surface portion of said body to a preferential oxidizing treatment to convert the material of said surface portion into tellurium.

2. A method of providing a tellurium layer on a cadmium-telluride semi-conductive body, which comprises treating a surface portion of said body with an oxidizing solution of a concentration, at a temperature, and for a time sufficient to convert the material of said surface portion into tellurium.

3. A method as set forth in claim 2 wherein the solution contains a strong oxidizing agent in an acid medium.

4. A method as set forth in claim 3 wherein the acid medium is HCl.

References Cited in the file of this patent

UNITED STATES PATENTS

| | | |
|---|---|---|
| 1,751,361 | Ruben | Mar. 18, 1930 |
| 2,408,116 | Von Hippel | Sept. 24, 1956 |

| Oxidizing means | Concentr. in percent | Temp. in ° C. | Time in min. | Concentr. HCl in percent | Result |
|---|---|---|---|---|---|
| $I_2$ | 0.05 n | 40 | | | no reaction. |
| | 0.05 n | 70 | 3 | | Te-layer. |
| | 0.1 n | 70 | 3 | | Te-layer plus oxide. |
| | 0.05 n | 20 | 3 | 20.2 | Te-layer. |
| | 0.15 n | 20 | 3 | 20.2 | Do. |
| | 0.3 | 70 | 5 | | Do. |
| | 2 | 40 | | | no reaction. |
| | 2 | 70 | 3 | | Te-layer with oxide spots. |
| | 12.5 | 20 | some sec. | | adhering black deposition with free Te. |
| $FeCl_3$ | 1 | 20 | 10 | 20.2 | Te-layer. |
| | 1 | 20 | 20 | 10.1 | Do. |
| | 1 | 20 | | 5.05 | no reaction. |
| | 1 | 40 | 10 | 5.05 | Te-layer. |
| | 1 | 20 | | 2.02 | no reaction. |
| | 1 | 60 | 10 | 2.02 | Te-plus oxide spots. |
| $H_2O_2$ | 1 | 20 | 3 | 20.2 | Te-layer. |
| | 3 | 20 | | 20.2 | black deposit. |
| | 0.5 | 20 | 10 | 20.2 | Te-layer plus some oxide. |
| | 0.5 | 20 | 10 | 10.1 | Do. |
| | 0.5 | 30 | 3 | 10.1 | Te-layer. |
| | 0.5 | 40–50 | 3 | 8 | Te-layer plus oxide spots. |
| | 22 | 20 | 3 | | Te-layer. |
| | 22 | 40 | 3 | | Te-layer plus oxide. |
| $HNO_3$ | 12 | 30–50 | 3 | | Te-layer. |
| | 6 | 20 | 3 | 20.2 | Do. |
| | 3 | 20 | 3 | 20.2 | no reaction. |
| | 3 | 40 | 3 | 20.2 | Te-layer. |
| $Ce(SO_4)_2$ | 1 | 30–40 | 1 | 20 | Do. |

UNITED STATES PATENT OFFICE

CERTIFICATE OF CORRECTION

Patent No. 2,822,299 February 4, 1958

Dirk de Nobel

It is hereby certified that error appears in the above numbered patent requiring correction and that the said Letters Patent should read as corrected below.

In the heading to the printed specification, between lines 8 and 9, insert -- Claims priority, application Netherlands December 4, 1954 --.

Signed and sealed this 22nd day of April 1958.

(SEAL)
Attest:
KARL H. AXLINE
Attesting Officer

ROBERT C. WATSON
Commissioner of Patents